(12) United States Patent
Kelliny

(10) Patent No.: US 12,714,538 B2
(45) **Date of Patent: *Aug. 25, 2026**

(54) ACCESS GUIDE AND DRILL KIT TO BE USED WITH SAME FOR ENDODONTIC ACCESS CAVITY PREPARATION AND METHOD OF USE

(71) Applicant: David W. Kelliny, Torrance, CA (US)

(72) Inventor: David W. Kelliny, Torrance, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/925,464

(22) Filed: Oct. 24, 2024

(65) Prior Publication Data

US 2025/0041024 A1 Feb. 6, 2025

Related U.S. Application Data

(63) Continuation of application No. 18/350,534, filed on Jul. 11, 2023, now Pat. No. 12,150,829, which is a (Continued)

(51) Int. Cl.
*A61C 5/44* (2017.01)
*A61C 1/08* (2006.01)
(Continued)

(52) U.S. Cl.
CPC ................ *A61C 5/44* (2017.02); *A61C 1/082* (2013.01); *A61C 5/42* (2017.02); *A61C 3/02* (2013.01)

(58) Field of Classification Search
CPC .. A61C 5/44; A61C 5/42; A61C 1/082; A61C 3/02
(Continued)

(56) References Cited

U.S. PATENT DOCUMENTS 5,829,590 A * 11/1998 Klein ........................ A61C 3/04 206/443
6,379,155 B1 * 4/2002 Riitano .................... A61C 5/42 433/102

(Continued)

FOREIGN PATENT DOCUMENTS

AU 2006275806 B2 * 7/2009 ............... A61C 5/42
BR 112013021024 B1 * 12/2020 ............... A61C 5/48

(Continued)

OTHER PUBLICATIONS

Buchgreitz, et al., “Guided access cavity preparation using cone-beam computed tomography and optical surface scans—an ex vivo study”, International Endodontic Journal, 49, pp. 790-795, 2016.

(Continued)

*Primary Examiner* — Matthew M Nelson
(74) *Attorney, Agent, or Firm* — Manatt, Phelps & Phillips, LLP

(57) ABSTRACT

A set of drill bits and/or burrs for attaching to a hand piece and fitting into an access guide during endodontic access cavity preparation is provided. The drill bits are optionally grouped into two types: a high speed, friction grip attachment type drill bit and a slow speed, latch attachment type drill bit. Each of the drill bits has a different longitudinal length for performing different functions during operation procedures. A method of performing an endodontic access cavity preparation with the set of drill bits is also provided.

21 Claims, 5 Drawing Sheets

Related U.S. Application Data continuation of application No. 17/455,769, filed on Nov. 19, 2021, now Pat. No. 11,744,673, which is a continuation of application No. 16/039,228, filed on Jul. 18, 2018, now Pat. No. 11,191,616.

(60) Provisional application No. 62/575,434, filed on Oct. 21, 2017.

(51) Int. Cl.
*A61C 5/42* (2017.01)
*A61C 3/02* (2006.01)

(58) Field of Classification Search
USPC ........................................................... 433/75
See application file for complete search history.

(56) References Cited

U.S. PATENT DOCUMENTS 6,390,814 B1 * 5/2002 Gardiner ................ A61C 1/082 433/102
10,357,333 B2 * 7/2019 Mohammad ............ A61C 5/42
2003/0044755 A1 * 3/2003 Jensen ................... A61C 19/04 433/215
2004/0043357 A1 * 3/2004 Garman ................... A61C 5/42 433/102
2006/0188840 A1 * 8/2006 Verban ............... A61B 17/1673 433/75
2006/0223034 A1 * 10/2006 Fischer .................... A61C 5/44 433/165
2007/0281275 A1 * 12/2007 Bina ....................... A61C 5/44 433/165
2010/0304326 A1 * 12/2010 Krasner ................... A61C 5/40 433/224
2011/0129793 A1 * 6/2011 Goodis .................... A61C 5/44 433/81
2011/0217673 A1 * 9/2011 Scianamblo ............ A61C 5/42 433/102
2012/0178043 A1 * 7/2012 Haber .................... A61C 1/082 433/165
2012/0214125 A1 * 8/2012 Clark ....................... A61C 5/42 433/102
2012/0276500 A1 * 11/2012 Mannschedel ........... A61C 5/42 433/102
2013/0171580 A1 * 7/2013 Van Lierde ............. A61B 6/51 433/29
2013/0263700 A1 * 10/2013 Johnson .................. A61C 5/42 76/12
2015/0099238 A1 * 4/2015 Chesler .................. A61C 8/005 433/221
2015/0182298 A1 * 7/2015 Neeman ................. A61C 1/084 433/173
2015/0320516 A1 * 11/2015 Suttin ............... A61C 13/0003 433/173
2016/0022377 A1 * 1/2016 Ramos ................... A61C 1/144 433/102
2016/0051339 A1 * 2/2016 Rouiller .................... C22F 1/10 433/102
2016/0192945 A1 * 7/2016 Scianamblo ........... B23B 51/02 606/80
2016/0199151 A1 * 7/2016 Lantz ................. A61B 17/1633 433/75
2018/0092708 A1 * 4/2018 Cora ........................ A61C 5/42
2018/0092712 A1 * 4/2018 Bosisio .................. A61B 90/98
2018/0256287 A1 * 9/2018 Bosisio .................... A61C 5/42
2019/0183606 A1 * 6/2019 Marin .................... A61C 1/084
2023/0012247 A1 * 1/2023 Shotton .................... A61C 5/40

FOREIGN PATENT DOCUMENTS

CN 114206255 A * 3/2022 ............... A61C 5/42
CN 219846852 U * 10/2023
EP 0684019 A1 * 11/1995 ............... A61C 5/42
EP 1021995 B1 * 4/2007 ............... A61C 3/02
JP 2003088536 A * 3/2003 ............... A61C 3/02
JP 2006502816 A * 1/2006 ............... A61C 3/00
WO WO-2005051217 A2 * 6/2005 ............... A61C 3/02
WO WO-2012112909 A1 * 8/2012 ............... A61C 5/42
WO WO-2017100828 A1 * 6/2017 ............... A61C 3/02

OTHER PUBLICATIONS

Connert, et al., "Microguided Endodontics: Accuracy of a Miniaturized Technique for Apically Extended Access Cavity Preparation in Anterior Teeth", JOE, vol. 43, No. 5, May 2017, http://dx.doi.org/10.1016/j.joen.2016.12.016.
Krast, et al., "Guided Endodontics: a novel treatment approach for teeth with pulp canal calcification and apical pathology", Dental Traumatology, 32, pp. 240-246, 2016.
Van Der Meer, "3D Computer aided treatment planning in endodontics", Journal of Dentistry, 45, pp. 67-72, 2016.
Zehnder, "Guided endodontics: accuracy of a novel method for guided access cavity preparation and root canal location", International Endodontic Journal, 49, pp. 966-972, 2016.

* cited by examiner

ACCESS GUIDE AND DRILL KIT TO BE USED WITH SAME FOR ENDODONTIC ACCESS CAVITY PREPARATION AND METHOD OF USE

RELATED APPLICATIONS

This application is a continuation of U.S. patent application Ser. No. 18/350,534, filed Jul. 11, 2023, which is a continuation of U.S. patent application Ser. No. 17/455,769, filed Nov. 19, 2021, now U.S. Pat. No. 11,744,673, which is a continuation of U.S. patent application Ser. No. 16/039,228, filed Jul. 18, 2018, now U.S. Pat. No. 11,191,616, which claims the benefit of, and priority to, U.S. Provisional Application No. 62/575,434, filed on Oct. 21, 2017. All of the above applications are hereby incorporated herein by reference in their entirety.

BACKGROUND

In order to perform endodontic treatment of root canals, an endodontist or dentist typically needs to first prepare an access cavity. The quality of the preparation of an access cavity may be the key factor of a successful endodontic treatment. A good access cavity design and preparation can prevent iatrogenic problems and/or endodontic failure. On the other hand, an inadequate access cavity preparation may make it difficult to locate the root canals and may cause inadequate cleaning, shaping and filling of the root canal system. It may also contribute to instrument separation and aberrations of the canal shape. Yet an excessive access cavity means unnecessary substance loss. Thus, a proper access cavity preparation can be a challenge to most endodontists or dentists.

Conventional procedures to access calcified teeth has relied on the ability to drill in the precise direction of the anticipated canal opening based on the appropriate knowledge of anatomy, 3D mental visualization and handling skills of the endodontist or dentist who holds the dental drill in a steady position. Therefore, the quality of the procedures is highly dependent on the skills and knowledges of the endodontist or dentist.

A variety of guided endodontic treatment procedures were recently developed to provide treatment procedures that are less dependent on operator skill. For example, a digital endodontic treatment plan for anterior teeth with severely obliterated root canal systems was accomplished with the aid of computer software, based on cone beam computer tomography (CBCT) scans and intra-oral scans. On the basis of these scans, endodontic guides were created for the planned treatment through digital design and rapid prototyping fabrication. (Wicher J. van der Meer, et al. "3D Computer aided treatment planning in endodontics" Journal of Dentistry 45(2016) 67-72; this article is incorporated herein by reference in its entirety.) Although guided endodontic treatment procedures can reduce the dependency on the skills and knowledge of the operator and can perform substantial uniform results independent from the operator, root canal drilling can still cause defects such as craze lines and dentinal cracks that may lead to tooth loss. Therefore, I have determined that there are still areas to improve on the structural aspects of the drill bits and the procedure of using the drill bits.

SUMMARY

The present invention provides, in some embodiments, a drill kit for endodontic access cavity preparation of a patient's teeth. In some embodiments, the drill kit includes: a first drill bit having a first shank, a first shaft and a first head, the first shaft has a substantially uniform cylindrical outer surface and a longitudinal length. In some embodiment, the first shaft is connected to the first shank at a first connecting point and the first head at a first transition point, the first head has a first head longitudinal length and is tapered from the first transition point to a first tip. In some embodiments, a second drill bit is provided and includes a second shank, a second shaft and a second head, the second shaft has a substantially uniform cylindrical outer surface and a longitudinal length, the second shaft is connected to the second shank at a second connecting point and the second head at a second transition point. In some embodiments, the second head has a second head longitudinal length and is tapered from the second transition point to a second tip, and the second longitudinal length of the second shaft is longer than the first longitudinal length of the first shaft.

In some embodiments, the drill kit further includes a first stop lip positioned at the first connecting point and a second stop lip positioned at the second connecting point. In some embodiments, the second head longitudinal length of the second head is longer than the first head longitudinal length of the first head. In some embodiments, the first shank has a first attachment type and the second shank has the substantially same attachment type as that of the first shank. In some embodiments, the first attachment type is a friction grip attachment type. In some embodiments, the first shank has a first attachment type and the second shank has a second attachment type. In some embodiments, the first attachment type is a friction grip attachment type, and the second attachment type is a latch attachment type. In some embodiments, the drill kit further includes a third drill bit having a third shank, a third shaft and a third head, the third shaft has a substantially uniform cylindrical outer surface and a third longitudinal length, the third shaft is connected to the third shank at a third connecting point and the third head at a third transition point, the third head has a third head longitudinal length and is tapered from the third transition point to a third tip, the third longitudinal length of the third shaft is longer than the second longitudinal length of the second shaft, and the third head longitudinal length of the third head is longer than the second head longitudinal length of the second head. In some embodiments, the first shank has a first attachment type, the second shank has the same attachment type as that of the first shank, and the third shank has the substantially same attachment type as that of the first shank. In some embodiments, the drill kit further includes a fourth drill bit having a fourth shank, a fourth shaft and a fourth head, the fourth shaft has a substantially uniform cylindrical outer surface and a fourth longitudinal length, the fourth shaft is connected to the fourth shank at a fourth connecting point and the fourth head at a fourth transition point, the fourth head has a fourth head longitudinal length and is tapered from the fourth transition point to a fourth tip, the fourth head longitudinal length of the fourth shaft is longer than the third head longitudinal length of the third shaft. In some embodiments, the fourth head longitudinal length of the fourth head is longer than the third head longitudinal length of the third head. In some embodiments, the fourth head longitudinal length of the fourth head is shorter than the third head longitudinal length of the third head. In some embodiments, the first shank has a first attachment type, the second shank has substantially the same attachment type as that of the first shank, the third shank has the substantially same attachment type as that of the first shank, and the fourth shank has a second attachment type.

In some embodiments, the present invention provides, a drill kit for endodontic access cavity preparation to be used with an access guide to be mounted to a patient's teeth, the drill kit includes: a plurality of first type drill bits, each of the first type drill bits having a first shank, a first shaft and a first head, the first shaft has a substantially uniform cylindrical outer surface and a first longitudinal length, the first shaft is connected to the first shank at a first connecting point and the first head at a first transition point, the first head has a first head longitudinal length and is tapered from the first transition point to a first tip; and a plurality of second type drill bits, each of the second type drill bits having a second shank, a second shaft and a second head, the second shaft has a substantially uniform cylindrical outer surface and a second longitudinal length, the second shaft is connected to the second shank at a second connecting point and the second head at a second transition point, the second head has a second head longitudinal length and is tapered from the second transition point to a second tip.

In some embodiments, the present invention provides, a drilling method for endodontic access cavity preparation to be used with an access guide to be mounted to a patient's teeth, the method includes: performing a first drill with a first drill bit having a first shank, a first shaft and a first head, the first shaft has a substantially uniform cylindrical outer surface and a longitudinal length, the first shaft is connected to the first shank at a first connecting point and the first head at a first transition point, the first head has a first head longitudinal length and is tapered from the first transition point to a first tip; and performing a second drill with a second drill bit having a second shank, a second shaft and a second head, the second shaft has a substantially uniform cylindrical outer surface and a longitudinal length, the second shaft is connected to the second shank at a second connecting point and the second head at a second transition point, the second head has a second head longitudinal length and is tapered from the second transition point to a second tip, the second longitudinal length of the second shaft is longer than the first longitudinal length of the first shaft.

In some embodiments, the method further includes: performing a third drill with a third drill bit having a third shank, a third shaft and a third head, the third shaft has a substantially uniform cylindrical outer surface and a third longitudinal length, the third shaft is connected to the third shank at a third connecting point and the third head at a third transition point, the third head has a third head longitudinal length and is tapered from the third transition point to a third tip, the third longitudinal length of the third shaft is longer than the second longitudinal length of the second shaft, and the third head longitudinal length of the third head is longer than the second head longitudinal length of the second head. In some embodiments, the first shank has a first attachment type, the second shank has the same attachment type as that of the first shank, and the third shank has the substantially same attachment type as that of the first shank. In some embodiments, the method further includes: performing a fourth drill with a fourth drill bit having a fourth shank, a fourth shaft and a fourth head, the fourth shaft has a substantially uniform cylindrical outer surface and a fourth longitudinal length, the fourth shaft is connected to the fourth shank at a fourth connecting point and the fourth head at a fourth transition point, the fourth head has a fourth head longitudinal length and is tapered from the fourth transition point to a fourth tip, the fourth longitudinal length of the fourth shaft is longer than the third longitudinal length of the third shaft. In some embodiments, the first shank has a first attachment type, the second shank has the substantially same attachment type as that of the first shank, the third shank has the substantially same attachment type as that of the first shank, and the fourth shank has a second attachment type. In some embodiments, the fourth head longitudinal length of the fourth head is shorter than the third head longitudinal length of the third head.

In some embodiments, the present invention provides, an assembly of access guide and drill kit for endodontic access cavity preparation, the assembly includes: a plurality of first type drill bits, each of the plurality of first type drill bits having a longitudinal length that is different from that of the other first type drill bits; a plurality of second type drill bits, each of the plurality of second type drill bits having a longitudinal length that is different from that of the other second type drill bits; and an access guide having a protrusion portion configured to accept a hole opened therethrough, and the hole is configured to guide the plurality of first type drill bits and the plurality of second type drill bits during an endodontic access cavity preparation procedure.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of preferred embodiments of the apparatus and method, will be better understood when read in conjunction with the appended drawings. For the purposes of illustrating certain aspects of the present invention, preferred embodiments are either shown in the drawings or described herein. It should be understood, however, that the apparatus and method is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods.

The drawings are not necessarily drawn to scale and are not in any way intended to limit the scope of the invention, but merely to clarify various exemplary embodiments of the invention.

DETAILED DESCRIPTION

An overview of the drill kits with access guide for endodontic access cavity preparation and method of use according to some embodiments of the invention is first provided below. In some embodiments, a cone beam computer tomography (CBCT) can be taken on the tooth to be treated to generate a CBCT dataset that may include a 3D model of the roots of the teeth. The CBCT dataset can be converted into a surface model using an optimal threshold to depict bone, teeth or the pulp. A 3D model of the crowns of the teeth (digital registration) can be performed by using, for example, an intra-oral scanner. The above-mentioned models can be aligned and registered, for example, by a software tool.

In some embodiments, a virtual cylinder can be generated and used to depict the direction of the drill necessary to locate the root canal system. The virtual cylinder can be aligned with the line between the center of the remaining root canal and the center of the palatal surface of the crown of the tooth. This cylinder can be used for the design of a directional guide (e.g., metal sleeve or other material sleeve/guide) that will prospectively guide the drill.

A surgical access guide, for example in the form of a mouth piece, can be digitally designed. The access guide can use the dentition for stable anatomical fixation and extends from the left first premolar to the right first premolar. Other sized access guides can optionally be used that provide the directional guide as described herein. Expansion of the dentition is preferably performed to compensate for the polymerization shrinkage that occurs in most 3D printing technologies, thus ensuring a proper fit. A hole can be modelled in the surgical access guide in which a metal tube or other material tube or sleeve can be placed.

Figure 1:
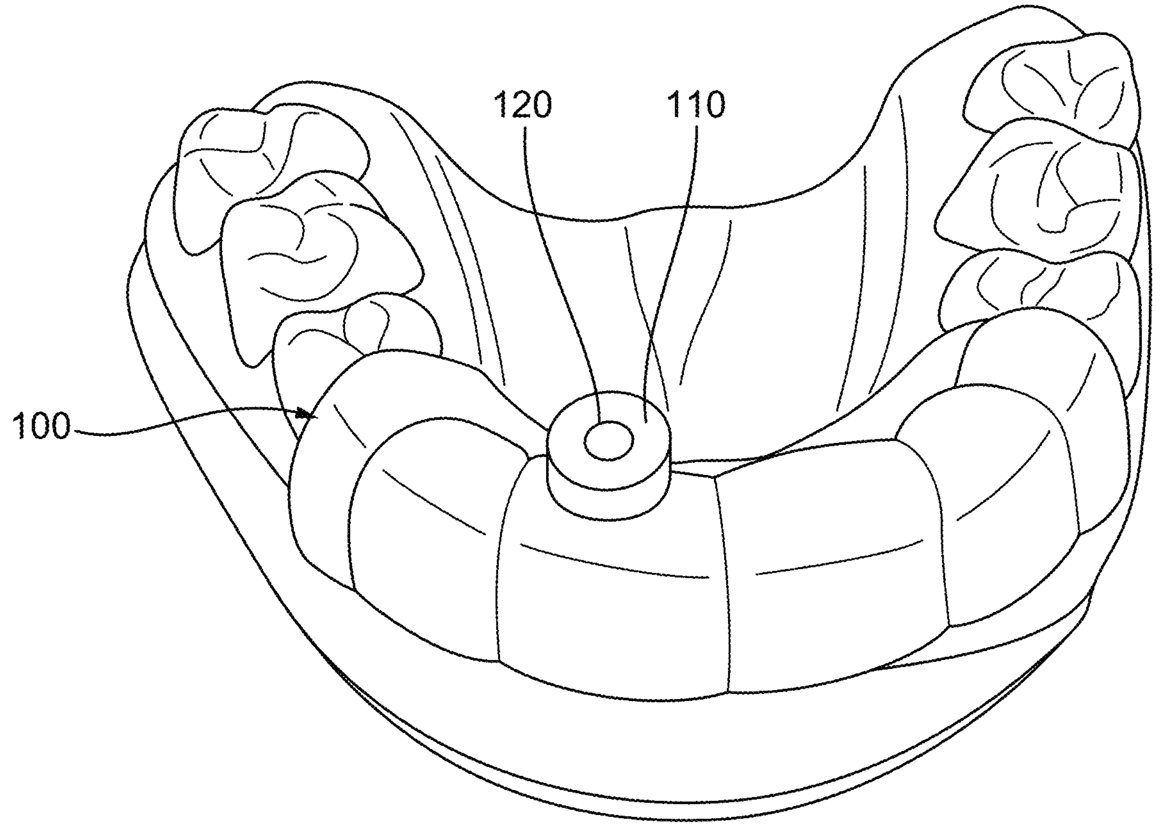
FIG. 1 is a perspective view showing an access guide been mounted on a patient's teeth according to some embodiments.

When the design for the access guide is complete, it can be sent to a dental lab or a prototyping facility to make a physical access guide for endodontic access cavity preparation. In some embodiments, the access guide design can be used to make the physical access guide on premises using standard guide technology with a protrusion portion have a drill bit access guide formed therein. FIG. 1 is a perspective view showing an access guide 100 been mounted on a patient's teeth. The access guide 100 has a teeth facing internal shape or grooved interior impression molded to fit and/or receive the patient's teeth. In one embodiment, the access guide 100 covers at least three other teeth that are adjacent to the tooth under treatment.

The access guide 100 includes protrusion portion 110 configured to facilitate the drilling procedure in the direction of the teeth. In some embodiments, the protrusion portion 110 has a cylindrical outer surface and is shaped or configured in a direction substantially perpendicular to the direction of drilling. In one embodiment, the protrusion portion 110 is shaped or configured in a direction that preferably forms an anger with the direction of drilling in the range of 0° to 1°, or more preferably 0° to 0.1°, or even more preferably 0° to 0.01°. Preferably, the access guide 100 can be produced by a 3D printer with line widths range from 20 to 100 microns. A hole/aperture 120, configured to guide the drill bits during dental procedures, is preferably configured through the protrusion portion 110. The hole/aperture 120 has a central axis that is preferably aligned with at least a portion of the longitudinal direction of the protrusion portion 110.

Figure 2:
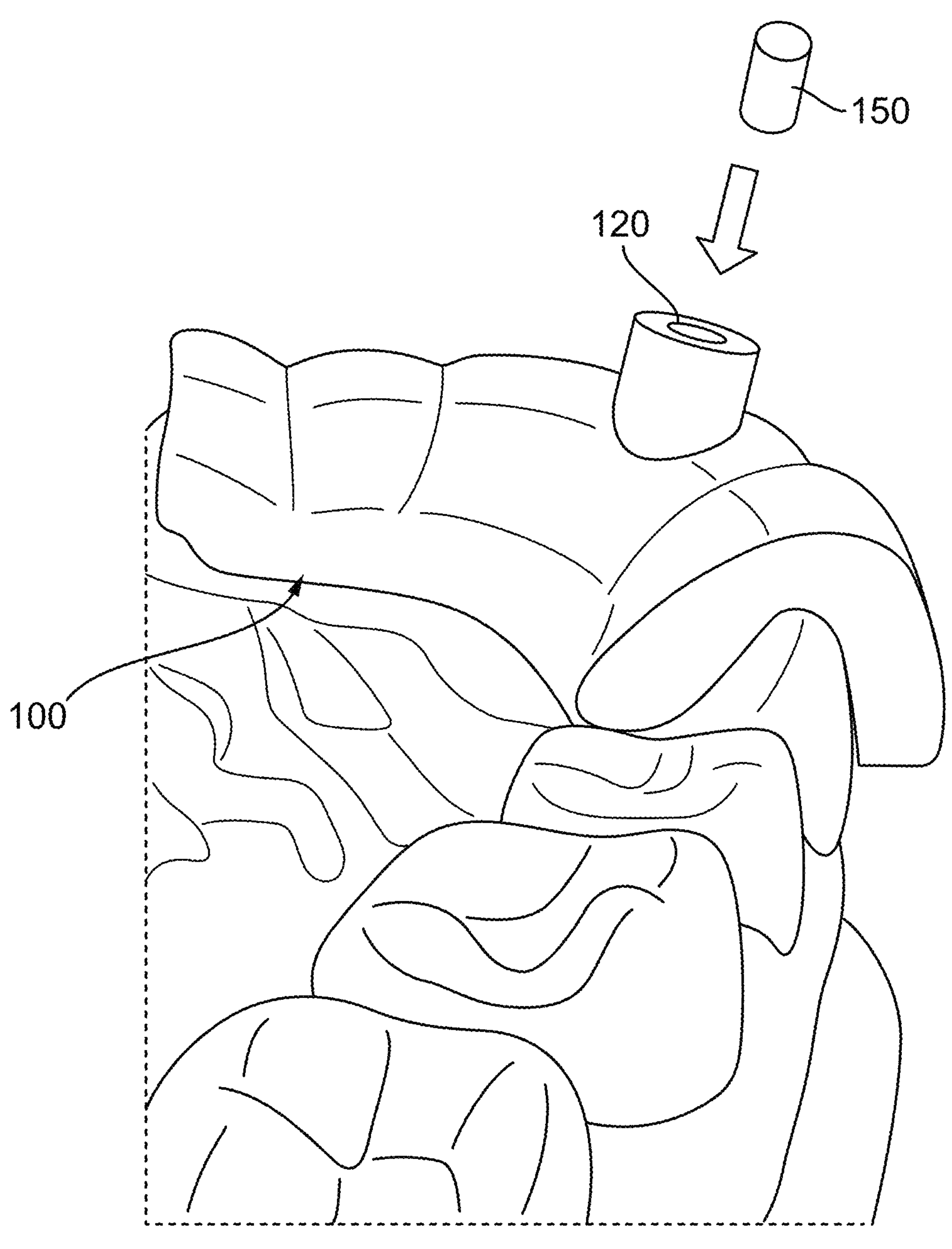
FIG. 2 is a perspective view showing a metal sleeve to be inserted into a hole of an access guide according to some embodiments.

FIG. 2 is a perspective view showing a metal sleeve or tube 150 to be inserted into the hole 120 of the access guide 100. After producing the access guide 100, the metal tube 150 can be placed in the corresponding hole 120. The metal tube 150 has an inner diameter that is preferably slightly larger than the outer diameter of the burrs or drill bits to be used during the location of the root canal system. In one embodiment, inner diameter of the metal tube 150 is larger than the outer diameter of the burrs or drill bits in the range of 0 mm to 2.0 mm, or more preferably 0.5 mm to 1.5 mm, or even more preferably 0.78 mm to 1.25 mm. This metal tube 150 can be used to guide the endodontic drill during the drilling process. In addition, this metal tube 150 can prevent or reduce the access guide 100 from been worn during the drilling process. In one embodiment, the metal tube 150 has an inner diameter of 1.43 mm, an outer diameter of 2.55 mm and a height of 4 mm. In another embodiment, the metal tube 150 has an inner diameter of 1.45 mm, an outer diameter of 2.00 mm and a height of 4 mm. It is understood that other dimensions can also be used for the metal tube 150. In some embodiments, no tube is used for insertion in aperture 120. In some embodiments, other materials and/or combination of materials can be used for metal tube 150.

A set of drill bits or burrs, preferably having the same outer diameter, to fit into the metal tube 150 are provided to be attached to a hand piece. The drill bits can be attached to the same hand piece or other stabilization device in sequence during the drilling process. Alternatively, a plurality of hand pieces can be provided, for example, each of the drill bits has a corresponding hand piece so as to shorten the time for changing drill bits during operation procedures. In some embodiments, separate guides 100 can be prepared with different sized tubes 150 to correspond to different sized drilling operations and/or bits and/or depths.

In some embodiments, each drill bit can have a different dimensions (length, width and/or head shape), and different rotating rates for performing different functions during operation procedures. In some embodiments, the drill bits are categorized into two types: a high speed, friction grip attachment type drill bit 200 and a slow speed, latch attachment type drill bit 300.

Figure 3:
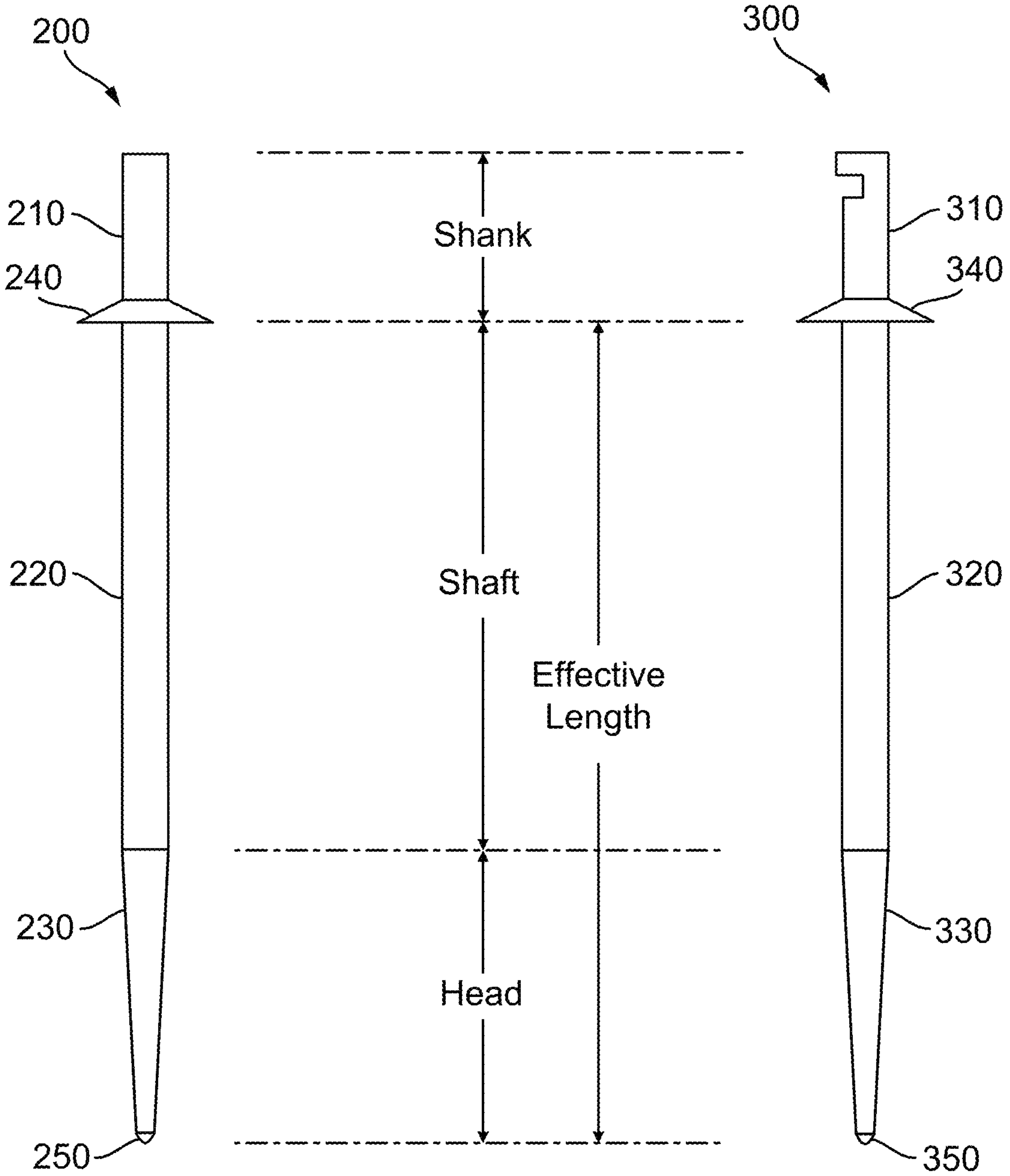
FIG. 3 depicts two type of drill bits according to some embodiments.

Referring to FIG. 3, a high speed, friction grip attachment type drill bit 200 has a shank 210, a parallel side shaft 220 and a taper head 230. The shank 210 is configured to be attached to a dental hand piece by friction gripping and/or other methods/devices. The parallel side shaft 220 is coupled to the shank 210 at one end and the taper head 230 at the other end. In the present embodiment, the parallel side shaft 220 has a substantially uniformly cylindrical outer surface. In one embodiment, the straightness of the cylindrical outer surface of the parallel side shaft 220 is in the range of 0 mm to 0.05 mm. In some embodiments, the outer surface can be of a different shape The parallel side shaft 220 can fit tight in the guide tube 150 for a controlled direction and angulation of the drills. The high speed, friction grip attachment type drill bit 200 can have the substantially same outer diameter while having a variety of longitudinal lengths on the parallel side shaft 220 portion. In one embodiment, the tolerance of the outer diameter between the high speed, friction grip attachment type drill bits having a variety of longitudinal lengths on the parallel side shaft 220 portion is limited to 0.05 mm. The taper head 230 can have the substantially same outer diameter as the parallel side shaft 220 at the end coupled to the parallel side shaft 220 and is tapered (or stay the same diameter, in one embodiment) along the longitudinal direction toward a tip 250. The taper head 230 of the high speed, friction grip attachment type drill bit 200 can also have a variety of longitudinal lengths. In some embodiments, each of the drill bits 200 has a stop lip 240 that can engage the protrusion portion 110 of the access guide 100 to prevent further advancement of the drill. Therefore, the effective length corresponding to the depth of the drill is the total length of the parallel side shaft 220 and the taper head 230 according to some embodiments.

Also referring to FIG. 3, in some embodiments, a low speed, latch attachment type drill bit 300 has a shank 310, a parallel side shaft 320 and a taper head 330. The shank 310 is configured to be attached to a dental hand piece by a latching mechanism. The parallel side shaft 320 is coupled to the shank 310 at one end and the taper head 330 at the other end. In some embodiments, the parallel side shaft 320 has a substantially uniform cylindrical outer surface. The parallel side shaft 320 is sized and/or configured to fit tight in the guide tube 150 for a controlled direction and angulation of the drills. In one embodiment, the gap between the outer diameter of the parallel side shaft 320 and the internal diameter of the guide tube 150 is limited to 0.05 mm. In some embodiments, the parallel side shaft 320 of all low speed, latch attachment type drill bits 300 all have the substantially same outer diameter while having a variety of longitudinal lengths. The taper head 330 has the substantially same outer diameter as the parallel side shaft 320 at the end coupled to the parallel side shaft 320 and is tapered (or stay the same diameter, in one embodiment) along the longitudinal direction. The taper head 330 can also have a variety of longitudinal lengths. Each of the drill bits 300 has a stop lip 340 that can engage the protrusion portion 110 of the access guide 100 to prevent further advancement of the drill. Therefore, the effective length corresponds to the depth of the drill is the total length of the parallel side shaft 320 and the taper head 330. In some embodiments, alternatives to a stop bit and/or no stop bit is optionally used.

The taper heads 230, 330 can contain blades to remove material. In one embodiment, the taper heads 230, 330 and the whole drill bits 200, 300 are made of tungsten carbide. In other embodiments, the taper heads 230, 330 are made of diamond. Other materials may optionally be used for taper heads 230, 330.

Tables 1-5 are lists of a variety of exemplary drill bit sets, respectively, with the dimensions of the effective length, shaft length, head length, shaft diameter and tip diameter for each drill bit shown in the corresponding row.

TABLE 1

Exemplary Drill Bit Set - Embodiment No. 1

| Drill Bit No. | Attachment Type | Effective Length (mm) | Shaft Length (mm) | Head Length (mm) | Shaft Diameter (mm) | Tip Diameter (mm) |
|---|---|---|---|---|---|---|
| 1 | Friction Grip | 8 | 5 | 3 | 1.4 | 1.4 |
| 2 | Friction Grip | 10 | 6 | 4 | 1.4 | 1.4 |
| 3 | Friction Grip | 14 | 8 | 6 | 1.4 | 1.4 |
| 4 | Latch | 16 | 12 | 4 | 1.4 | 1.0 |
| 5 | Latch | 18 | 12 | 6 | 1.4 | 1.0 |
| 6 | Latch | 20 | 12 | 8 | 1.4 | 1.0 |
| 7 | Latch | 22 | 12 | 10 | 1.4 | 0.8 |
| 8 | Latch | 18 | 12 | 6 | 1.4 | 1.4 |
| 9 | Latch | 24 | 14 | 10 | 1.4 | 0.8 |
| 10 | Latch | 26 | 16 | 10 | 1.4 | 0.8 |

TABLE 2

Exemplary Drill Bit Set - Embodiment No. 2

| Drill Bit No. | Attachment Type | Effective Length (mm) | Shaft Length (mm) | Head Length (mm) | Shaft Diameter (mm) | Tip Diameter (mm) |
|---|---|---|---|---|---|---|
| 1 | Friction Grip | 8 | 4 | 4 | 1.4 | 1.4 |
| 2 | Friction Grip | 10 | 4 | 6 | 1.4 | 1.4 |
| 3 | Friction Grip | 12 | 4 | 8 | 1.4 | 1.4 |
| 4 | Latch | 14 | 6 | 8 | 1.4 | 1.0 |
| 5 | Latch | 16 | 8 | 8 | 1.4 | 1.0 |
| 6 | Latch | 18 | 10 | 8 | 1.4 | 1.0 |
| 7 | Latch | 20 | 12 | 8 | 1.4 | 0.8 |
| 8 | Latch | 22 | 14 | 8 | 1.4 | 1.4 |
| 9 | Latch | 24 | 16 | 8 | 1.4 | 0.8 |
| 10 | Latch | 26 | 16 | 8 | 1.4 | 0.8 |

TABLE 3

Exemplary Drill Bit Set - Embodiment No. 3

| Drill Bit No. | Attachment Type | Effective Length (mm) | Shaft Length (mm) | Head Length (mm) | Shaft Diameter (mm) | Tip Diameter (mm) |
|---|---|---|---|---|---|---|
| 1 | Friction Grip | 8 | 5 | 3 | 1.4 | 1.4 |
| 2 | Friction Grip | 10 | 6 | 4 | 1.4 | 1.4 |
| 3 | Friction Grip | 14 | 8 | 6 | 1.4 | 1.4 |
| 4 | Latch | 14 | 6 | 8 | 1.4 | 1.0 |
| 5 | Latch | 16 | 8 | 8 | 1.4 | 1.0 |
| 6 | Latch | 18 | 10 | 8 | 1.4 | 1.0 |
| 7 | Latch | 20 | 12 | 8 | 1.4 | 1.0 |
| 8 | Latch | 20 | 12 | 8 | 1.4 | 1.0 |
| 9 | Latch | 22 | 14 | 8 | 1.4 | 1.0 |
| 10 | Latch | 24 | 16 | 8 | 1.4 | 1.0 |

TABLE 4

Exemplary Drill Bit Set - Embodiment No. 4

| Drill Bit No. | Attachment Type | Effective Length (mm) | Shaft Length (mm) | Head Length (mm) | Shaft Diameter (mm) | Tip Diameter (mm) |
|---|---|---|---|---|---|---|
| 1 | Friction Grip | 8 | 5 | 3 | 1.4 | 1.4 |
| 2 | Friction Grip | 10 | 6 | 4 | 1.4 | 1.4 |
| 3 | Friction Grip | 14 | 8 | 6 | 1.4 | 1.0 |
| 4 | Latch | 16 | 11 | 5 | 1.4 | 1.0 |
| 5 | Latch | 18 | 12 | 6 | 1.4 | 1.0 |
| 6 | Latch | 20 | 12 | 8 | 1.4 | 1.0 |
| 7 | Latch | 22 | 12 | 10 | 1.4 | 1.0 |
| 8 | Latch | 18 | 12 | 6 | 1.4 | 1.4 |
| 9 | Latch | 24 | 14 | 10 | 1.4 | 0.8 |
| 10 | Latch | 26 | 16 | 10 | 1.4 | 0.6 |

TABLE 5

Exemplary Drill Bit Set - Embodiment No. 5

| Drill Bit No. | Attachment Type | Effective Length (mm) | Shaft Length (mm) | Head Length (mm) | Shaft Diameter (mm) | Tip Diameter (mm) |
|---|---|---|---|---|---|---|
| 1 | Friction Grip | 8 | 5 | 3 | 1.4 | 1.4 |
| 2 | Friction Grip | 10 | 6 | 4 | 1.4 | 1.4 |
| 3 | Friction Grip | 14 | 8 | 6 | 1.4 | 1.4 |
| 4 | Latch | 16 | 12 | 4 | 1.4 | 1.4 |
| 5 | Latch | 18 | 12 | 6 | 1.4 | 1.4 |
| 6 | Latch | 20 | 12 | 8 | 1.4 | 1.4 |
| 7 | Latch | 22 | 12 | 10 | 1.4 | 1.4 |
| 8 | Latch | 18 | 12 | 6 | 1.4 | 1.4 |
| 9 | Latch | 24 | 14 | 10 | 1.4 | 0.8 |
| 10 | Latch | 26 | 16 | 10 | 1.4 | 0.8 |

According to the embodiments depicted in Tables 1-5, each of the drill bit sets or drill kits preferably has 10 drill bits or burrs (drill bit nos. 1-10). In other embodiments, other numbers of drill bits can be provided. The first three drill bits are preferably the high speed, friction grip attachment type drill bits 200. The high speed, friction grip attachment type drill bits 200 can be used to access the tooth, and cut through tooth enamel at a relatively high speed resulting in an efficient and time saving process. The rest seven drill bits are preferably the slow speed, latch attachment type drill bits 300 to complete the drilling process with precise effective length/depth into the tooth for each drilling. The longitudinal length of the parallel side shafts 220, 320 can vary and the longitudinal length of the taper heads 230, 330 can vary. When the effective length/depth (the total length of the parallel side shaft 220, 320 and the taper head 230, 330) of a single drill bit is relatively long, the diameter at the tip 250, 350 of the taper head 230, 330 is preferably smaller.

Referring to Table 1, which is an exemplary drill bit set, both the shaft length and the head length of the high speed, friction grip attachment type drill bits preferably increase from drill bit no. 1 to drill bit no. 3, respectively. In the present embodiment, the shaft lengths of drill bit nos. 1-3 are 5 mm, 6 mm and 8 mm, respectively, while the head lengths of drill bit nos. 1-3 are 3 mm, 4 mm and 6 mm, respectively. The tip diameter of each of these first three drill bits is preferably substantially the same dimension as their corresponding shaft diameter. In other words, there is no taper shape on the head for the first three drill bits of this exemplary drill bit set depicted in Table 1. In the present embodiment, the tip diameter is 1.4 mm for drill bit nos. 1-3. In the present embodiment, shaft diameter is 1.4 mm for each drill bits of the drill bit set.

Still referring to Table 1, the shaft length of the next four drill bits (the slow speed, latch attachment type, drill bit nos. 4-7) preferably stay substantially the same and the head lengths of these drill bits increase from drill bit no. 4 to drill bit no. 7. In the present embodiment, the shaft length of drill bit nos. 4-7 is 12 mm, while the head lengths of drill bit nos. 4-7 are 4 mm, 6 mm, 8 mm and 10 mm, respectively. The tip diameters of drill bit no. 4 to drill bit no. 6 are preferably substantially the same but smaller than that of the first three drill bits (drill bit nos. 1-3). The tip diameter for drill bit no. 7 is preferably smaller than the tip diameter of drill bit no. 6. In the present embodiment, the tip diameter is 1.0 mm for drill bit nos. 4-6 and 0.8 mm for drill bit no. 7.

Still referring to Table 1, the shaft lengths of the last three drill bits (the slow speed, latch attachment type, drill bit nos. 8-10) preferably increase from drill bit no. 8 to drill bit no. 10 yet the shaft length of drill bit no. 8 is preferably the same as that of drill bit no. 7. The head length of drill bit no. 8 is preferably shorter than that of drill bit no. 7. The head length of drill bit no. 9 is preferably longer than that of drill bit no. 8. The head length of drill bit no. 10 is preferably the same as that of drill bit no. 9. In the present embodiment, the shaft lengths of drill bit nos. 8-10 are 12 mm, 14 mm and 16 mm, respectively, while the head lengths of drill bit nos. 8-10 are 6 mm, 10 mm and 10 mm, respectively.

The tip diameter of drill bit no. 8 is preferably larger than that of drill bit no. 7. The tip diameter of drill bit no. 9 is preferably small than that of drill bit no. 8. The tip diameter of drill bit no. 10 is preferably the same as that of drill bit no. 9. In the present embodiment, the tip diameters of drill bit nos. 8-10 are 1.4 mm, 0.8 mm and 0.8 mm, respectively.

Referring now to Table 2, which is another exemplary drill bit set, the shaft lengths of the high speed, friction grip attachment type drill bits are preferably substantially the same for drill bit nos. 1-3 while the head lengths preferably increase from drill bit no. 1 to drill bit no. 3. The tip diameters of these first three drill bits are preferably substantially the same dimension as the shaft diameter.

Still referring to Table 2, the shaft lengths of the next four drill bits (the slow speed, latch attachment type, drill bit nos. 4-7) preferably increase from drill bit no. 4 to drill bit no. 7 while the head lengths of these drill bits preferably stay substantially the same. The tip diameters of drill bit nos. 4-6 are preferably substantially the same but smaller than that of the first three drill bits. The tip diameter for drill bit no. 7 is preferably smaller than the tip diameter of drill bit no. 6.

Still referring to Table 2, the shaft lengths of the last three drill bits (the slow speed, latch attachment type, drill bit nos. 8-10) preferably increase from drill bit no. 8 to drill bit no. 9 while the shaft length of drill bit no. 10 is preferably the same as that of drill bit no. 9. The head lengths of these drill bits (drill bit nos. 8-10) preferably stay substantially the same. In some embodiments, the head lengths of these drill bits (drill bit nos. 8-10) are substantially the same as the head lengths of the previous four drill bits (drill bit nos. 4-7). The tip diameter of drill bit no. 8 is preferably larger than that of drill bit no. 7. The tip diameter of drill bit no. 9 is preferably small than that of drill bit no. 8. The tip diameter of drill bit no. 10 is preferably the same as that of drill bit no. 9.

Referring now to Table 3, which is yet another exemplary drill bit set, both the shaft lengths and the head lengths of the high speed, friction grip attachment type drill bits preferably increase from drill bit no. 1 to drill bit no. 3, respectively. The tip diameter of each of these first three drill bits is preferably substantially the same dimension as their corresponding shaft diameter. In the present embodiment, the tip diameter is 1.4 mm for drill bit nos. 1-3.

Still referring to Table 3, the shaft lengths of the next four drill bits (the slow speed, latch attachment type, drill bit no. 4 to drill bit no. 7) preferably increase from drill bit no. 4 to drill bit no. 7 while the head lengths of these drill bits preferably stay substantially the same. The shaft length of drill bit no. 4 can be shorter than that of drill bit no. 3. The tip diameters of drill bit nos. 4-7 are preferably substantially the same but smaller than that of the first three drill bits.

Still referring to Table 3, in some embodiments, the shaft lengths of the last three drill bits (the slow speed, latch attachment type, drill bit nos. 8-10) preferably increase from drill bit no. 8 to drill bit no. 10. The head lengths of these drill bits (drill bit nos. 8-10) preferably stay substantially the same. In some embodiments, the head lengths of these drill bits (drill bit nos. 8-10) are substantially the same as the head lengths of the previous four drill bits (drill bit nos. 4-7). The tip diameters of these drill bits (drill bit nos. 8-10) are substantially the same as that of the previous four drill bits (drill bit nos. 4-7).

Referring now to Table 4, which is yet another exemplary drill bit set, both the shaft lengths and the head lengths of the high speed, friction grip attachment type drill bits preferably increase from drill bit no. 1 to drill bit no. 3, respectively. The tip diameters of drill bit no. 1 and drill bit no. 2 are preferably substantially the same dimension as the shaft diameter. The tip diameter of drill bit no. 3 is preferably smaller than that of the first two drill bits.

Still referring to Table 4, the shaft lengths of the next four drill bits (the slow speed, latch attachment type, drill bit nos. 4-7) preferably increase from drill bit no. 4 to drill bit no. 5 and then stay substantially the same for drill bit no. 6 to drill bit no. 7. The head lengths preferably increase from drill bit no. 4 to drill bit no. 7. The tip diameters of drill bit nos. 4-7 are preferably substantially the same as that of drill bit no. 3.

Still referring to Table 4, the shaft lengths of the last three drill bits (the slow speed, latch attachment type, drill bit nos. 8-10) preferably increase from drill bit no. 8 to drill bit no. 10. The head lengths of these drill bits (drill bit nos. 8-10) preferably increase from drill bit no. 8 to drill bit no. 9 and stay substantially the same for that of drill bit no. 10. In some embodiments, the head length of drill bit no. 8 is shorter than that of drill bit no. 7. The tip diameters of these drill bits (drill bit nos. 8-10) decrease from drill bit no. 8 to drill bit no. 10. In some embodiments, drill bit no. 10 has the smallest tip diameter among all drill bits of the same drill bit set as depicted in Table 4.

Referring now to Table 5, which is yet another exemplary drill bit set, both the shaft lengths and the head lengths of the high speed, friction grip attachment type drill bits preferably increase from drill bit no. 1 to drill bit no. 3, respectively. The tip diameters of these first three drill bits are preferably substantially the same dimension as that of the shaft diameter.

Still referring to Table 5, the shaft lengths of the next four drill bits (the slow speed, latch attachment type, drill bit nos. 4-7) are preferably substantially the same dimension. The head lengths preferably increase from drill bit no. 4 to drill bit no. 7. The tip diameters of drill bit no. 4 to drill bit no. 7 are preferably substantially the same as that of drill bit no. 3.

Still referring to Table 5, the shaft length of the last three drill bits (the slow speed, latch attachment type, drill bit nos. 8-10) preferably increase from drill bit no. 8 to drill bit no. 10. The head lengths of these drill bits (drill bit no. 8 to drill bit no. 10) preferably increase from drill bit no. 8 to drill bit no. 9 and stay substantially the same as that of drill bit no. 10. In some embodiments, the head length of drill bit no. 8 is shorter than that of drill bit no. 7. The tip diameter of drill bit no. 8 is preferably substantially the same as that of drill bit no. 7 while the tip diameter of drill bit no. 9 is preferably shorter that of drill bit no. 8. The tip diameter of drill bit no. 10 is preferably substantially the same as that of drill bit no. 9.

Before the drilling procedure 500 (see FIG. 4), the access guide 100 is to be mounted to the patient's teeth. When the access guide 100 is properly mounted, the protrusion portion 110 should be aligned with the corresponding tooth under procedure. The metal sleeve or tube 150 is also installed into the hole 120 of the access guide 100.

Figure 4:
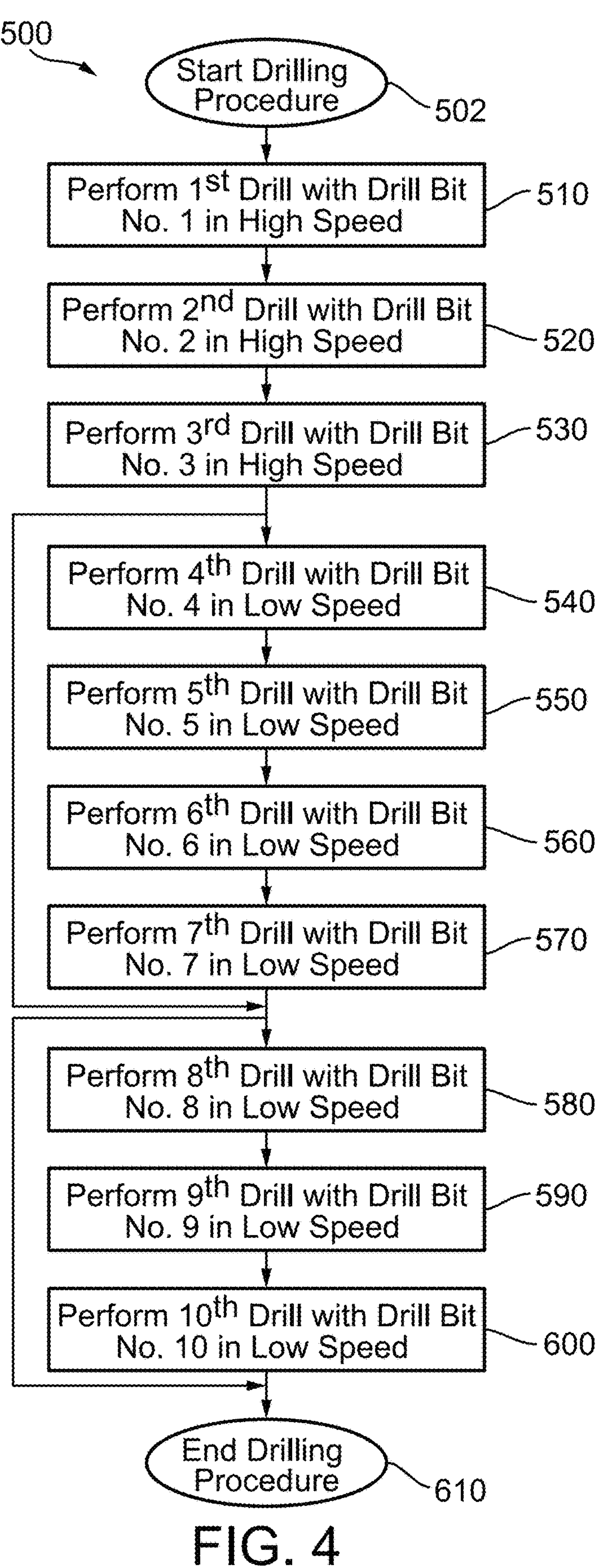
FIG. 4 is a flow chart depicting a drilling procedure according to some embodiments.

Referring to FIG. 4, once the drilling procedure starts 502, the endodontist or dentist who performs the procedure can select one of the drill bit sets depict in Tables 1-5 for drilling.

In step 510, a first drill can be performed by passing drill bit no. 1 through the access guide 100 and metal tube 150. The drilling is in a relatively high speed. Drill bit no. 1 typically has the shortest effective length (parallel side shaft length and taper head length) compared with other drill bits. This drill can access the tooth and cut through the tooth enamel at a relatively high speed to make the process efficiently. After drill step 510 is performed, a probing and/or vacuuming process can be performed to clean up.

In step 520, a second drill can be performed by passing drill bit no. 2 through the access guide 100 with metal tube 150 inserted. The drilling is also done using a relatively high speed. Drill bit no. 2 typically has a longer effective length than drill bit no. 1. This drill can further access the tooth and cut through tooth enamel at a relatively high speed to perform the process efficiently and/or quickly. After the drill step 520, a probing and/or vacuuming process can be performed to clean up.

In step 530, a third drill can be performed by passing drill bit no. 3 through the access guide 100 and metal tube 150. The drilling is also done using a relatively high speed. Drill bit no. 3 typically has a longer effective length than drill bit no. 2. This drill can further access the tooth and cut through the tooth enamel at a relatively high speed to perform the process efficiently and/or quickly. After the drill step 530, a probing and/or vacuuming process can be performed to clean up.

In step 540, a fourth drill can be performed by passing drill bit no. 4 through the access guide 100 and metal tube 150. This drilling is done using a relatively low speed comparing with that of the first three drillings. Drill bit no. 4 typically has a longer effective length than drill bit no. 3. This drill can further access the tooth depth at a relatively low speed. After the drill 540 step, a probing and/or vacuuming process can be performed to clean up.

In step 550, a fifth drill can be performed by passing drill bit no. 5 through the access guide 100 and metal tube 150. The drilling is performed using a relatively low speed. Drill bit no. 5 typically has a longer effective length than drill bit no. 4. This drill can further access the tooth depth at a relatively low speed. After the drill step 550, a probing and/or vacuuming process can be performed to clean up.

In step 560, a sixth drill can be performed by passing drill bit no. 6 through the access guide 100 and metal tube 150. This drilling is performed using a relatively low speed. Drill bit no. 6 typically has a longer effective length than drill bit no. 5. This drill can further access the tooth depth at a relatively low speed. After the drill step 560, a probing and/or vacuuming process can be performed for cleaning up.

In step 570, a seventh drill can be performed by passing drill bit no. 7 through the access guide 100 and metal tube 150. This drilling is performed using a relatively low speed. Drill bit no. 7 typically has a longer effective length than drill bit no. 6. This drill can further access the tooth depth at a relatively low speed. After the drill step 570, a probing and/or vacuuming process can be performed to clean up.

If a deeper drilling procedure is required, the procedure can continue in step 580. In step 580, an eighth drilling step can be performed by inserting drill bit no. 8 through the access guide 100 and metal tube 150. This drilling is performed using a relatively low speed. Drill bit no. 8 typically has a shorter effective length than drill bit no. 7. This drill can further access the tooth depth at a relatively low speed. After the drill step 580, a probing and/or vacuuming process can be performed for cleaning up.

In step 590, a ninth drilling process can be performed by inserting drill bit no. 9 through the access guide 100 and metal tube 150. The drilling is performed using a relatively low speed. Drill bit no. 9 typically has a longer effective length than drill bit no. 8. This drill can further access the tooth depth using a relatively low speed. After the drill step 590, a probing and/or vacuuming process can be performed to clean up.

In step 600, a tenth drilling process can be performed by inserting drill bit no. 10 through the access guide 100 and metal tube 150. The drilling is performed using a relatively low speed. Drill bit no. 10 typically has a longer effective length than drill bit no. 9. This drill can further access the tooth depth using a relatively low speed. After the drill 600, a probing and/or vacuuming process can be performed to clean up.

Figure 5:
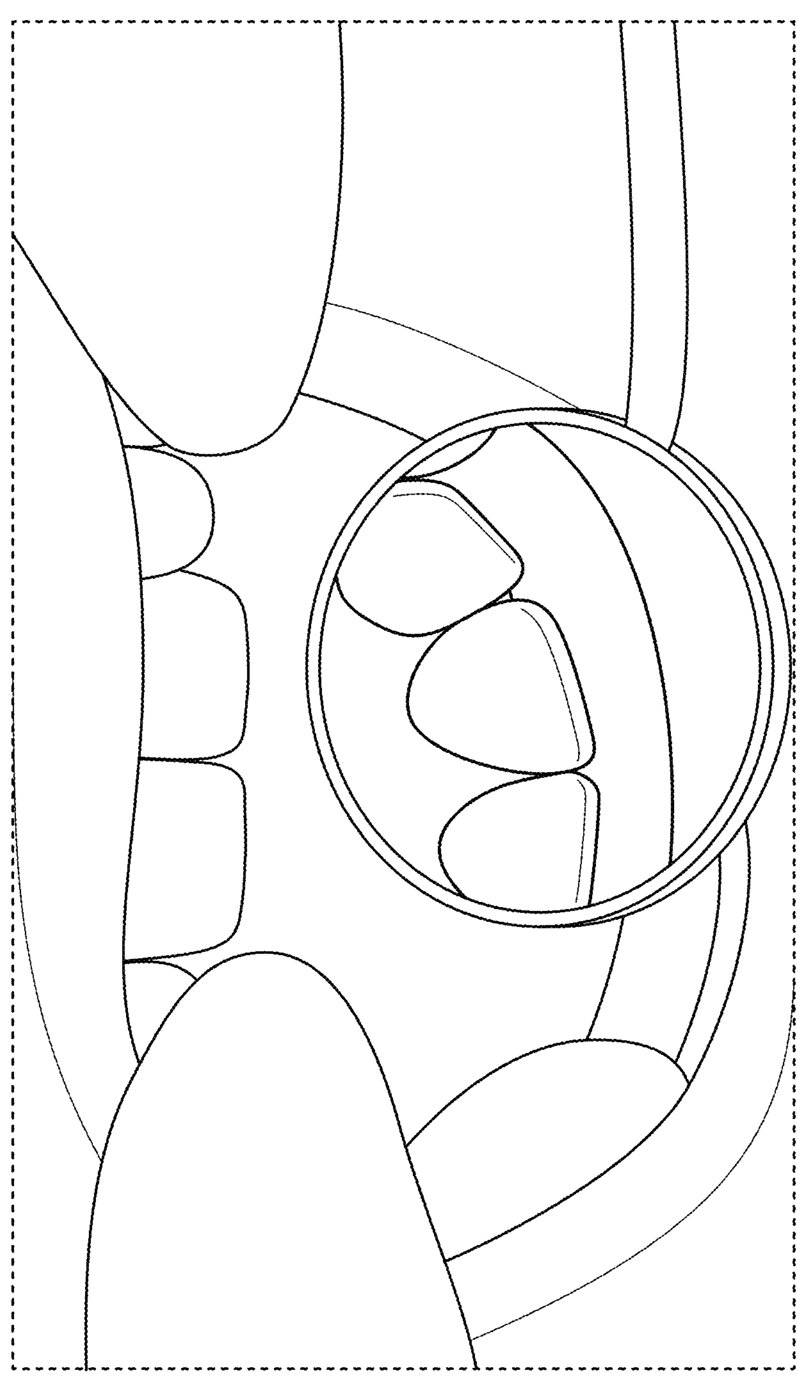
FIG. 5 is a perspective view showing a small size cavity on a patient's tooth after drilling procedure is complete according to some embodiments.

Typically, after step 600, the cavity preparation procedure is complete 610. As shown in FIG. 5, the hole opened on the tooth is relatively small compared with other procedures while the root canal is effectively performed. The follow up procedure such as filing and crowing can be performed using standard techniques.

For the purposes of illustrating certain aspects of the present invention, the preferred embodiments are described above and illustrated in the drawings. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific apparatus described above may be altered so that certain parts are independent or combinable with other parts, to the extent that the parts are not dependent upon each other. Thus, the specific parts described herein are not to be considered implying specific parts to implement the above described apparatus. Other alterations or modifications of the above apparatus are also contemplated. For example, further insubstantial changes and/or interchangeable parts of the above are also considered within the scope of the apparatus described herein.

In addition, features illustrated or described as part of one embodiment can be used on other embodiments to yield a still further embodiment. Additionally, certain features may be interchanged with similar devices or features not mentioned yet which perform the same or similar functions. Further, while a specific sequence of process steps has been described, the sequence and/or order of steps can be modified in any suitable manner to achieve the results of the present invention. It is therefore intended that such modifications and variations are included within the totality of the present invention.

The invention claimed is:

1. A method of performing an endodontic procedure using a drill kit for endodontic access cavity preparation of a patient's teeth, the method comprising:

drilling a first opening through an access guide by using a first drill bit having first shank, a first shaft and a first head, the first head has a first head longitudinal length, wherein said drilling the first opening is performed at a first rotating speed to make the first opening of an access cavity in a patient's teeth; and drilling a second opening through the access guide by using a second drill bit having a second shank, a second shaft and a second head, the second head has a second head longitudinal length, the second head longitudinal length is longer than the first head longitudinal length wherein said drilling the second opening is performed at a second rotating speed that is slower than the first rotating speed to make the second opening of the access cavity, wherein the second drill bit is used after and in response to the use of the first drill bit during the same endodontic access cavity preparation that the second opening of the access cavity is smaller and deeper into the root structure of the patient's teeth than the first opening of the access cavity.

2. The method of claim 1, further comprising vacuuming after drilling the first opening.

3. The method of claim 1, further comprising a first stop lip positioned at a first connecting point and a second stop lip positioned at a second connecting point, wherein the first connecting point connects the first shaft and the first shank, and wherein the second connecting point connects the second shaft and the second shank.

4. The method of claim 1, wherein the first shank has a first attachment and wherein the second shank has the substantially same attachment as that of the first shank.

5. The method of claim 1, wherein the first shank has a first attachment and wherein the second shank has a second attachment.

6. A method of performing an endodontic procedure using a drill kit for endodontic access cavity preparation of a patient's teeth, the method comprising:

drilling a first opening using a first drill bit having a first shank, a first shaft and a first head, the first head has a first head longitudinal length, wherein said drilling the first opening is performed at a first rotating speed to make a first opening of an access cavity in a patient's teeth, the first opening of the access cavity has a first diameter; and drilling a second opening using a second drill bit having a second shank, a second shaft and a second head, the second head has a second head longitudinal length, the second head longitudinal length is longer than the first head longitudinal length, wherein said drilling the second opening is performed at a second rotating speed that is slower than the first rotating speed to make a second opening of the access cavity, and the second drill bit is configured to generate a second diameter of the second opening of the access cavity that the second diameter of the second opening of the access cavity is smaller than the first diameter of the first opening of the access cavity, and wherein the second drill bit is used after and in response to the use of the first drill bit during the same endodontic access cavity preparation that the second opening of the access cavity is smaller and deeper into the root structure of the patient's teeth than the first opening of the access cavity.

7. The method of claim 6, further comprising a first stop lip positioned at a first connecting point and a second stop lip positioned at a second connecting point, wherein the first connecting point connects the first shaft and the first shank, and wherein the second connecting point connects the second shaft and the second shank.

8. The method of claim 6, wherein the first shank has a first attachment and wherein the second shank has the substantially same attachment as that of the first shank.

9. The method of claim 8, wherein the first attachment is a friction grip attachment.

10. The method of claim 6, wherein the first shank has a first attachment and wherein the second shank has a second attachment.

11. The method of claim 10, wherein the first attachment is a friction grip attachment, and wherein the second attachment is a latch attachment.

12. The method of claim 11, further comprising the step of drilling using a third drill bit having a third shank, a third shaft and a third head, the third shaft has a substantially uniform cylindrical outer surface and a third longitudinal length, wherein the third longitudinal length of the third shaft is longer than a second longitudinal length of the second shaft, and wherein a third head longitudinal length of the third head is longer than the second head longitudinal length of the second head.

13. The method of claim 12, wherein the third shank has the same attachment as that of the first shank.

14. The method of claim 12, further comprising the step of drilling using a fourth drill bit having a fourth shank, a fourth shaft and a fourth head, the fourth shaft has a substantially uniform cylindrical outer surface and a fourth longitudinal length, wherein the fourth longitudinal length of the fourth shaft is longer than the third longitudinal length of the third shaft, and wherein a fourth head longitudinal length of the fourth head is longer than the third head longitudinal length of the third head.

15. The method of claim 14, wherein the third shank has the substantially same attachment as that of the first shank, and the fourth shank has a second attachment.

16. The method of claim 12, further comprising the step of drilling using a fourth drill bit having a fourth shank, a fourth shaft and a fourth head, the fourth shaft has a substantially uniform cylindrical outer surface and a fourth longitudinal length, wherein the fourth head longitudinal length of the fourth head is shorter than the third head longitudinal length of the third head.

17. The method of claim 16, wherein the third shank has the substantially same attachment as that of the first shank, and the fourth shank has a second attachment.

18. A method of performing an endodontic procedure using a drill kit for endodontic access cavity preparation of a patient's teeth, the method comprising:

drilling a first opening using a first drill bit at a first rotating speed to make a first opening of an access cavity in a patient's teeth, the first drill bit having a first shank, a first shaft and a first head, the first head has a first head longitudinal length;

drilling a second opening using a second drill bit at a second rotating speed to make a second opening of the access cavity, the second drill bit having a second shank, a second shaft and a second head, the second head has a second head longitudinal length;

drilling a third opening using a third drill bit at a third rotating speed to make a third opening of the access cavity, the third drill bit having a third shank, a third shaft and a third head, the third head has a third head longitudinal length; and drilling a fourth opening using a fourth drill bit at a fourth rotating speed to make a fourth opening of the access cavity, the fourth drill bit having a fourth shank, a fourth shaft and a fourth head, the fourth head has a fourth head longitudinal length, wherein the fourth rotating speed is slower than anyone of the first rotating speed, the second rotating speed, and the third rotating speed, wherein the second drill bit is used after and in response to the use of the first drill bit, the third drill bit is used after and in response to the use of the second drill bit, and the fourth drill bit is used after and in response to the use of the third drill bit during the same endodontic access cavity preparation.

19. The method of claim 18, wherein the first shank has a first attachment, the second shank has the substantially same attachment as that of the first shank, the third shank has the substantially same attachment as that of the first shank, and the fourth shank has a second attachment.

20. The method of claim 18, wherein the second rotating speed is substantially the same as the first rotating speed, and wherein the third rotating speed is substantially the same as the second rotating speed.

21. The method of claim 18, further comprising an access guide through which the step of drilling the first opening, drilling the second opening, drilling the third opening, and drilling the fourth opening are performed.

* * * * *